US006950590B2

(12) United States Patent
Cheung et al.

(10) Patent No.: US 6,950,590 B2
(45) Date of Patent: Sep. 27, 2005

(54) TRANSMISSION LINES AND COMPONENTS WITH WAVELENGTH REDUCTION AND SHIELDING

(76) Inventors: Tak Shun Cheung, 125 Omni Drive, Scarborough, Ontario (CA), M1P 5A9; John Robert Long, Binnenwatersloot 1, 5 APP.4 2617BJ, Delft (NL)

( * ) Notice: Subject to any disclaimer, the term of this patent is extended or adjusted under 35 U.S.C. 154(b) by 0 days.

(21) Appl. No.: 10/425,414

(22) Filed: Apr. 29, 2003

(65) Prior Publication Data

US 2004/0155728 A1 Aug. 12, 2004

(30) Foreign Application Priority Data

Feb. 7, 2003 (CA) ............................................ 2418674

(51) Int. Cl.[7] ................................................ G02B 6/10

(52) U.S. Cl. .......................... 385/129; 385/27; 385/39; 385/40; 385/131

(58) Field of Search ......................... 385/125, 129–132, 385/27, 39, 40

(56) References Cited

U.S. PATENT DOCUMENTS 3,975,753 A * 8/1976 Bharat ........................ 257/245
4,229,717 A * 10/1980 Krone et al. ................ 333/156
4,340,873 A * 7/1982 Bastida ....................... 333/161
4,914,407 A 4/1990 Itoh ........................... 333/161
5,150,436 A * 9/1992 Jaeger et al. .................. 385/2
5,311,605 A * 5/1994 Stewart ........................ 385/27
6,023,209 A * 2/2000 Faulkner et al. ............ 333/238

OTHER PUBLICATIONS

S. Seki and H. Hasegawa, "Cross–tie Slow–wave Coplanar Waveguide on Semi–Insulating GaAs Substrates," Electron. Lett., vol. 17, no. 25, pp. 940–941, Dec. 10, 1991.

Te–Hui Wang and Tatsuo Itoh, "Compact Grating Structure for Application to Filters and Resonators in Monolithic Microwave Integrated Circuits", IEEE Transaction on Microwave Theory and Techniques, vol. MTT–35, no. 12, Dec. 1997.

* cited by examiner

*Primary Examiner*—Juliana Kang
(74) *Attorney, Agent, or Firm*—Tarolli, Sundheim, Covell & Tummino L.L.P.

(57) ABSTRACT

A slow-wave transmission line component having a slow-wave structure. The slow-wave structure includes a floating shield employing one of electric and magnetic induction to set a potential on floating strips of said floating shield to about 0, thereby reducing losses caused by electric coupling to a substrate. A spacing between the strips is small to inhibit electric field from passing the metal strips to the substrate material.

29 Claims, 18 Drawing Sheets

"PRIOR ART"

"PRIOR ART"

"PRIOR ART"

Effective permittivity ($_r$) versus frequency

Quality factor versus frequency

Quality factor

Frequency (GHz)

TRANSMISSION LINES AND COMPONENTS WITH WAVELENGTH REDUCTION AND SHIELDING

FIELD OF THE INVENTION

The present invention relates in general to transmission lines and transmission line components, in particular novel electric shielding of transmission lines and components constructed therefrom.

BACKGROUND OF THE INVENTION

Faster, silicon-based technologies are driving new applications such as wireless LAN, point-to-multipoint distribution, and broadband data services such as gigabit per second (Gb/s) fibre-based systems. Shrinking transistor dimensions on-chip have increased gain-bandwidth frequencies beyond 200 GHz, however, it is widely recognized that passive components now limit the speed and frequency range of circuits at RF and higher operating frequencies. Energy coupled to the semiconducting substrate in silicon technologies via passive components is quickly dissipated. This constrains the gain and bandwidth of monolithic circuits. Also, at frequencies where wavelengths are shorter than 10 mm (i.e., millimeter-wave or above 12 GHz for signals on a silicon chip) the signal delay over interconnections must be factored into a typical integrated circuit design.

High performance transmission lines and components thereof are desirable for interconnections, impedance matching, resonant and distributed circuits, and for implementing devices such as signal splitters, hybrid couplers, inductors, and balun transformers.

One exemplary prior art device is shown in FIG. 1, a perspective view of a portion of a microstrip transmission line fabricated in silicon technology indicated generally by the numeral 15. A single top conductor 16 is disposed on an insulator 17 (typically silicon dioxide), a semiconductor 18 (silicon substrate) and attached to a metal ground plane 19. This forms a metal-insulator-semiconductor-metal (MISM) sandwich of insulating dielectric and silicon layers between the ground plane 19 and top-conductor metal 16. While this transmission line is simple, it suffers from high energy dissipation into the semiconducting silicon material resulting in pulse dispersion and attenuation of the signal being transferred that increases with increasing frequency.

Another exemplary prior art device is shown in FIG. 2, a perspective view of a portion of a coplanar waveguide (CPW) on-chip transmission line indicated generally by the numeral 20. (As will be described, FIGS. 1, 2 and 3 are directed to the prior art and are so labeled). The coplanar waveguide 20 includes 3 coplanar conductors, a center conductor 22 with two adjacent ground strips (conductors) 24, 26 in the same plane as the center conductor 22, all disposed on a substrate 28. For a semi-conductive substrate (e.g., silicon), an insulator 27 (e.g., silicon dioxide) is disposed between the coplanar conductors 22, 24, 26 and the substrate 28. If the substrate 28 is made of a semi-insulating material (e.g., gallium arsenide) or insulating material (e.g., alumina), the insulator 27 is not required. The coplanar conductors 22, 24, 26 tend to confine the electric field to the gap between conductors 22, 24, 26. However, current crowding along the conductor edges 22, 24, 26, at higher frequencies causes higher dissipation than for microstrip lines.

A third exemplary prior art device is shown in FIG. 3, a perspective view of a portion of a simple microstrip transmission line (i.e., metal-insulator-metal, or MIM) indicated generally by the numeral 30. The microstrip line 30 includes a strip conductor 32 disposed over an intermetal dielectric 33 and a ground sheet 34, followed by an underlying substrate 35.

The microstrip line 30 includes two layers of metal and therefore has a relatively large capacitance per unit length since the intermetal dielectric is generally a few microns thick. Also, the ground sheet must be slotted to relieve stress between the metal film and dielectric for metal areas larger than about 30×30 $m^2$ in typical VLSI (very large scale integration) interconnect metal schemes. Leakage of the electromagnetic fields via the slots to the underlying semiconductor, and dissipation due to current flow in the metals cause losses resulting in decreased performance. These losses are, however, substantially lower than for the MISM or CPW transmission lines.

SUMMARY OF THE INVENTION

In one aspect of the present invention a slow-wave transmission line component is provided. The component has at least two conductors, a substrate material disposed beneath at least one of the at least two conductors, and a plurality of metal strips disposed between at least one conductor of the at least two conductors and the substrate material, the metal strips being closely spaced apart such that an electric field from the conductors is inhibited from passing the metal strips to the substrate material while a magnetic field surrounding the conductors is substantially unaffected by the presence of the metal strips.

In another aspect of the present invention a slow-wave inductor is provided. The slow-wave inductor has at least one inductor coil layer comprising a metal strip, a substrate disposed beneath the inductor coil layer, and a plurality of metal strips disposed between the at least one inductor coil layer and the substrate material, for shielding the substrate material from the inductor coil layer.

In another aspect, there is provided a slow-wave transmission line component having a slow-wave structure. The slow-wave structure includes a floating shield employing one of electric and magnetic induction to set a potential on floating strips of said floating shield to about 0, thereby reducing losses caused by electric coupling to a substrate.

Advantageously, the present invention provides novel transmission lines with reduced energy loss to the substrate and reduced chip area for interconnect structures with a given wavelength on-chip, compared to conventional microstrip and coplanar waveguide transmission lines. In one particular transmission line according to an aspect of the present invention, wavelength reduction achieves a Q-factor>20 from 25 to 40 GHz, or about three times higher than conventional (MIM) transmission lines implemented with the same technology. An approximate loss of 0.3 dB/mm results, with the wavelength reduced by about a factor of two compared to a conventional transmission, thereby minimizing the chip area consumed by on-chip microwave devices.

BRIEF DESCRIPTION OF THE DRAWINGS

The present invention will be better understood with reference to the drawings, in which.

DETAILED DESCRIPTION OF THE PREFERRED EMBODIMENTS

Figure 1:
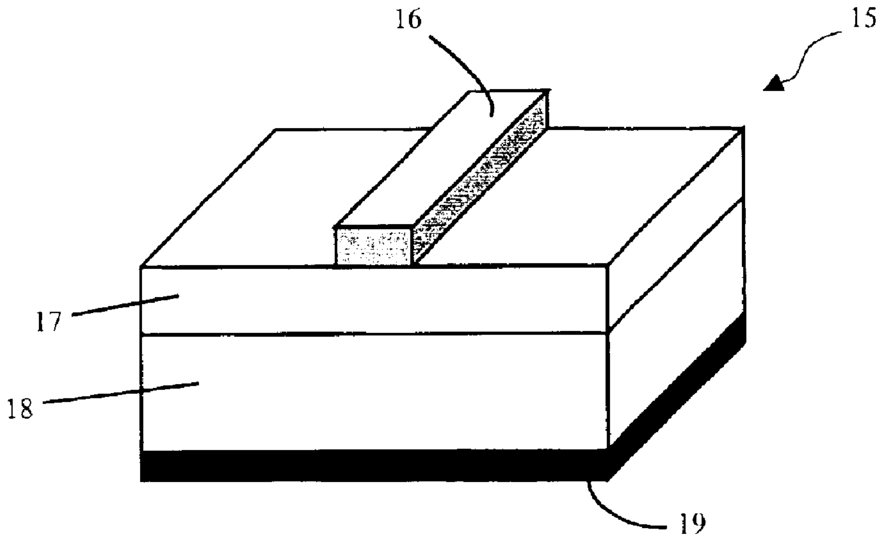
FIG. 1 is a simplified perspective view of a portion of a microstrip-on-silicon (MISM) on-chip transmission line according to the prior art.
Figure 2:
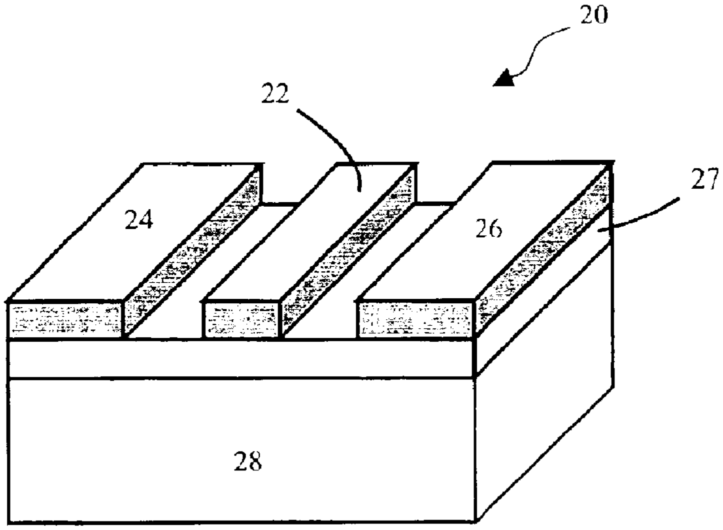
FIG. 2 is a simplified perspective view of a portion of a coplanar waveguide (CPW) on-chip transmission line according to the prior art.
Figure 3:
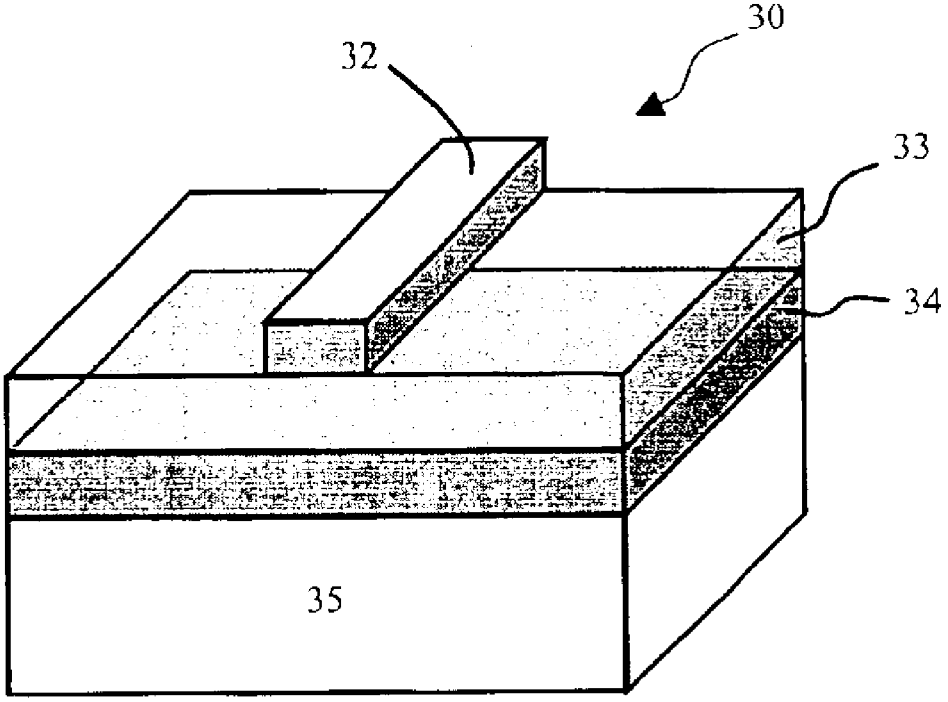
FIG. 3 is a simplified perspective view of a portion of a simple microstrip transmission line (MIM) according to the prior art.
Figure 4A:
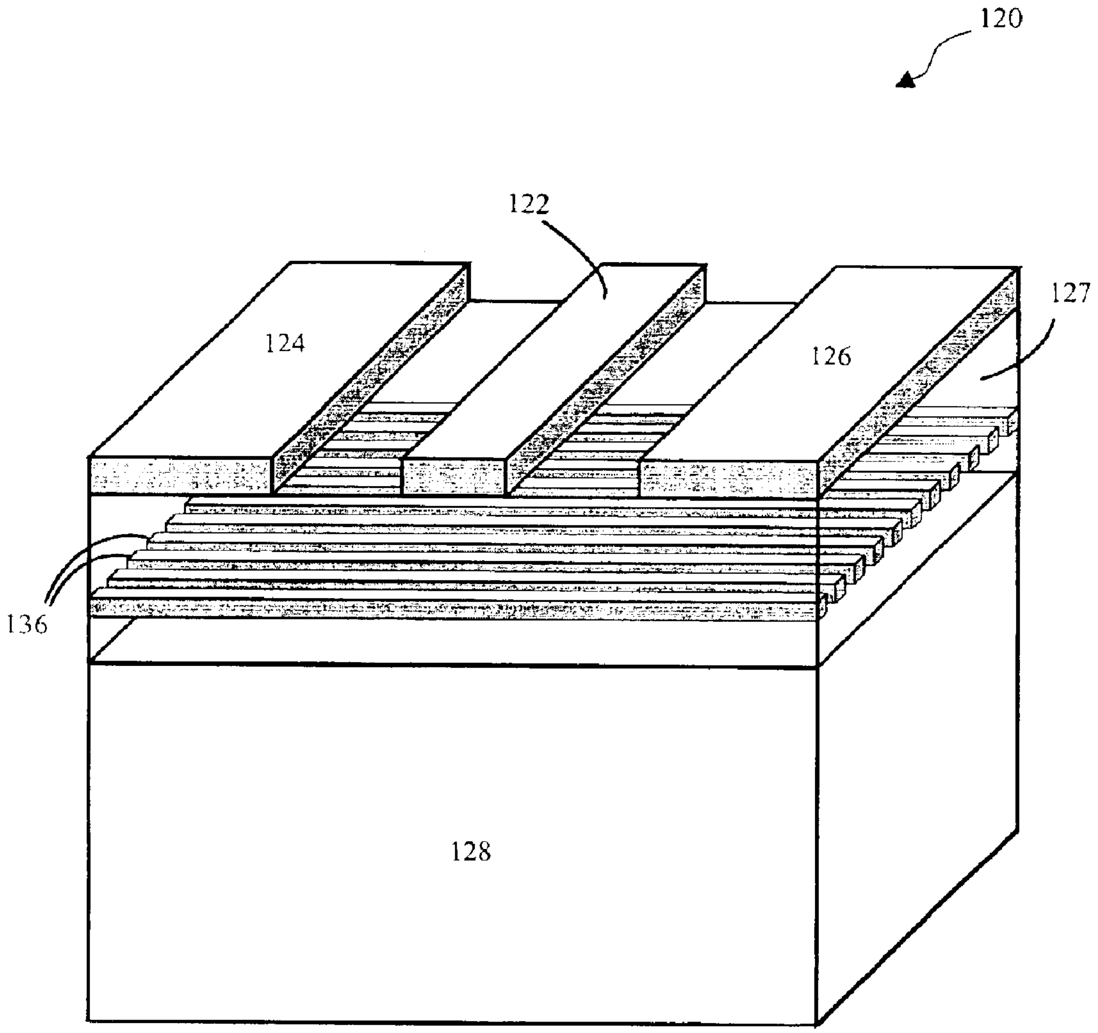
FIG. 4*a* is a simplified perspective view of a portion of a slow-wave coplanar conductor transmission line in accordance with an embodiment of the present invention.
Figure 4B:
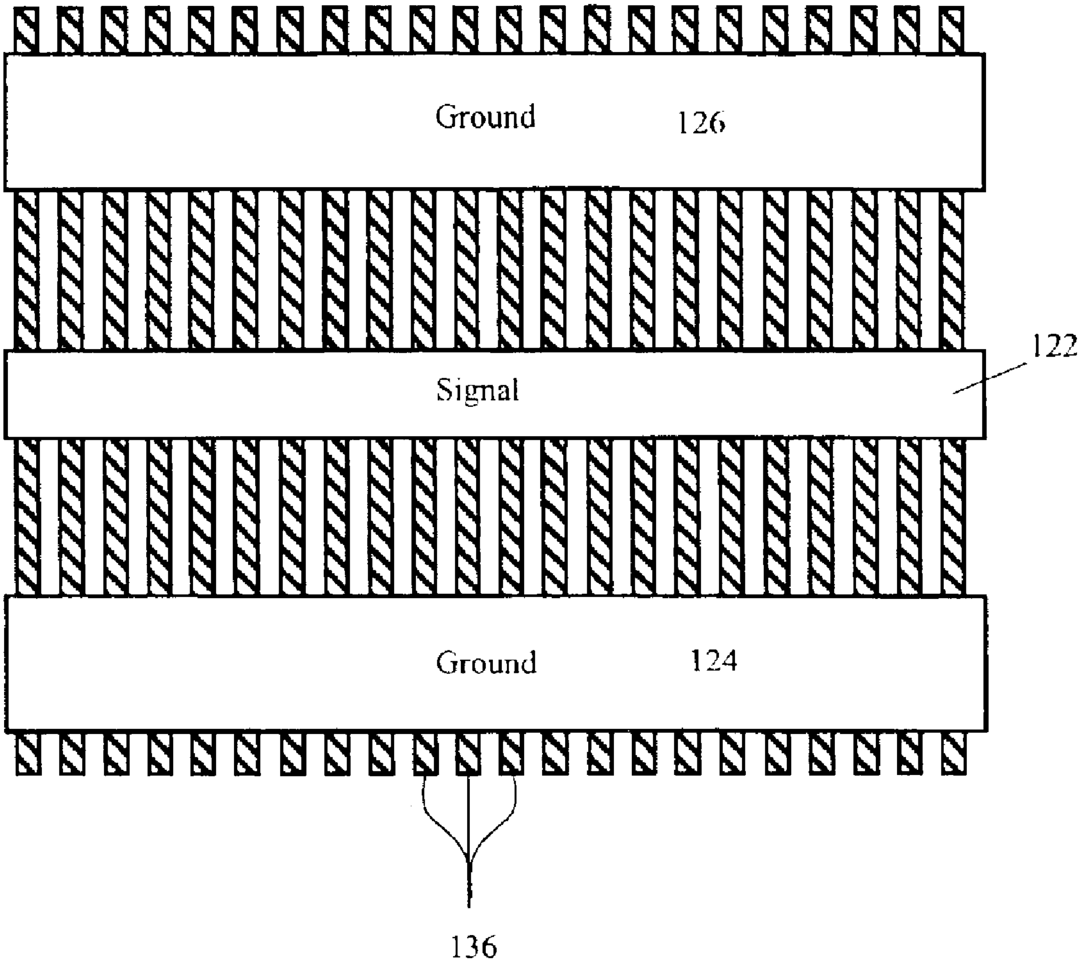
FIG. 4*b* is a simplified top view of a portion of the slow-wave coplanar conductor transmission line of FIG. 4*a;*

Reference is made to FIGS. 4*a* and 4*b* to describe a slow-wave coplanar conductor transmission line in accordance with an embodiment of the present invention, and indicated generally by the numeral 120. It will occur to those skilled in the art that the slow-wave coplanar conductor transmission line 120 has many similarities with the coplanar conductor transmission line 20 of the prior art, shown in FIG. 2. For simplicity, similar parts are denoted by similar numerals raised by 100.

The slow-wave coplanar conductor transmission line 120 (S-CPW) includes three coplanar conductors, a center signal conductor 122 with two adjacent ground strips 124, 126 to form a coplanar waveguide. An insulator 127 (e.g., silicon dioxide) is disposed beneath the coplanar waveguide formed by conductors 122, 124, 126. A substrate material 128 (e.g., a semiconducting silicon substrate) that has an equal or higher conductivity than that of the insulator 127 is disposed beneath the insulator 127. A plurality of spaced apart, substantially parallel metal strips 136 are disposed in the region of the insulator 127 beneath the signal conductor 122 and the ground strips 124, 126 (as best shown in FIG. 4*a*). Also referred to as floating strips, the metal strips 136 are not connected to either the ground strips 124, 126 or the center conductor 122. These metal strips 136 are very tightly spaced such that electric field is inhibited from passing through to the underlying substrate layer. In the present embodiment, the spacing between each strip is equal to the minimum dimension (width) of the metal strips 136. The width of these metal strips is in the direction of the current flow of the signal conductor 122. In the present embodiment, the spacing of the of metal strips 136 is about 1.6 microns. The metal strips decouple the electric and magnetic fields (in the vertical dimension from the conductors in the direction of the substrate) to form a slow-wave line. The electric field is inhibited from radiating to the substrate 128 and the minimum dimension (or width) of the strips 136 is oriented to inhibit current induced via magnetic induction between the top metal coplanar conductors 122, 124, 126 and the strips 136.

It should be noted that although the strip spacing identified in the present embodiment is 1.6 m, other strip spacings are possible. It is desired to use as small a spacing as possible. In future, it is likely that scaling of technologies will allow much smaller dimensions (e.g., 0.1 m) to be used. In the present embodiment, the width of the strips is chosen as small as possible, limited by the technology used. It will be understood that for acceptable performance, a range of widths could be used with a maximum practical value for the pitch between strips of 100 times the spacing between the strips as a guideline.

A particular implementation of the slow-wave coplanar conductor transmission line 120 will now be described in more detail. This particular implementation is included for exemplary purposes only and is not to be construed as limiting the scope of the present invention. In the present embodiment, the gap between the center signal conductor 122 and each of the ground conductors 124, 126 is relatively wide to achieve a large line inductance (L). To maintain the characteristic impedance (Z0) equal to 50 Ohms, the line capacitance (C) is increased using a wide center signal conductor 122, and the metal strips 136 are placed beneath the center signal conductor 122 and the ground conductors 124, 126 to encourage capacitive coupling without substantially affecting the line inductance L. The metal strips also inhibit the electric field from passing into the semiconducting substrate 128. Since the line inductance L and the line capacitance C are increased simultaneously, the speed of a wave travelling along the transmission line is much lower than the speed of a wave travelling along a transmission line of the prior art. This is called a slow-wave. As a result, the wavelength decreases while the line loss is lowered as well, and the energy dissipated per unit (electrical) length, quantified by the quality factor (Q) of the transmission line, improves. The slow-wave coplanar conductor transmission line 120 of the present embodiment uses 420 micron long lower level metal shield strips with minimum width (measured in the same direction as the current flow along the signal conductors of the top layer), and spacing between the strips of about 1.6 microns.

This novel slow-wave coplanar conductor configuration overcomes many of the performance limitations of prior art designs. The physical length of the transmission lines required to implement quarter-wavelength microwave devices is reduced as the electromagnetic wave velocity is lowered without requiring a change in the dielectric constant of the surrounding material. The shorter physical length for implementing quarter-wavelength microwave couplers or combiners leads to lower loss and less chip area usage. Also, this configuration permits a wider signal line for on-chip 50 Ohm line implementation to reduce the line resistance. Further, the electric field is shielded from the substrate to lower losses at high frequency.

Results of testing four transmission line configurations are included for comparison purposes. The four transmission line configurations include the microstrip-on-silicon (MISM) transmission line of the prior art, the simple microstrip (MIM) transmission line of the prior art, the coplanar waveguide (CPW) transmission line of the prior art, and the slow-wave coplanar transmission line 120 (S-CPW). The MISM, MIM and S-CPW transmission lines in comparison were fabricated on a semiconducting silicon substrate. The CPW transmission line is the reference standard. It is a commercially available CPW line fabricated on an insulating substrate. The losses and Q-factor of the reference standard represent a benchmark for a transmission line on a planar substrate.

Figure 5:
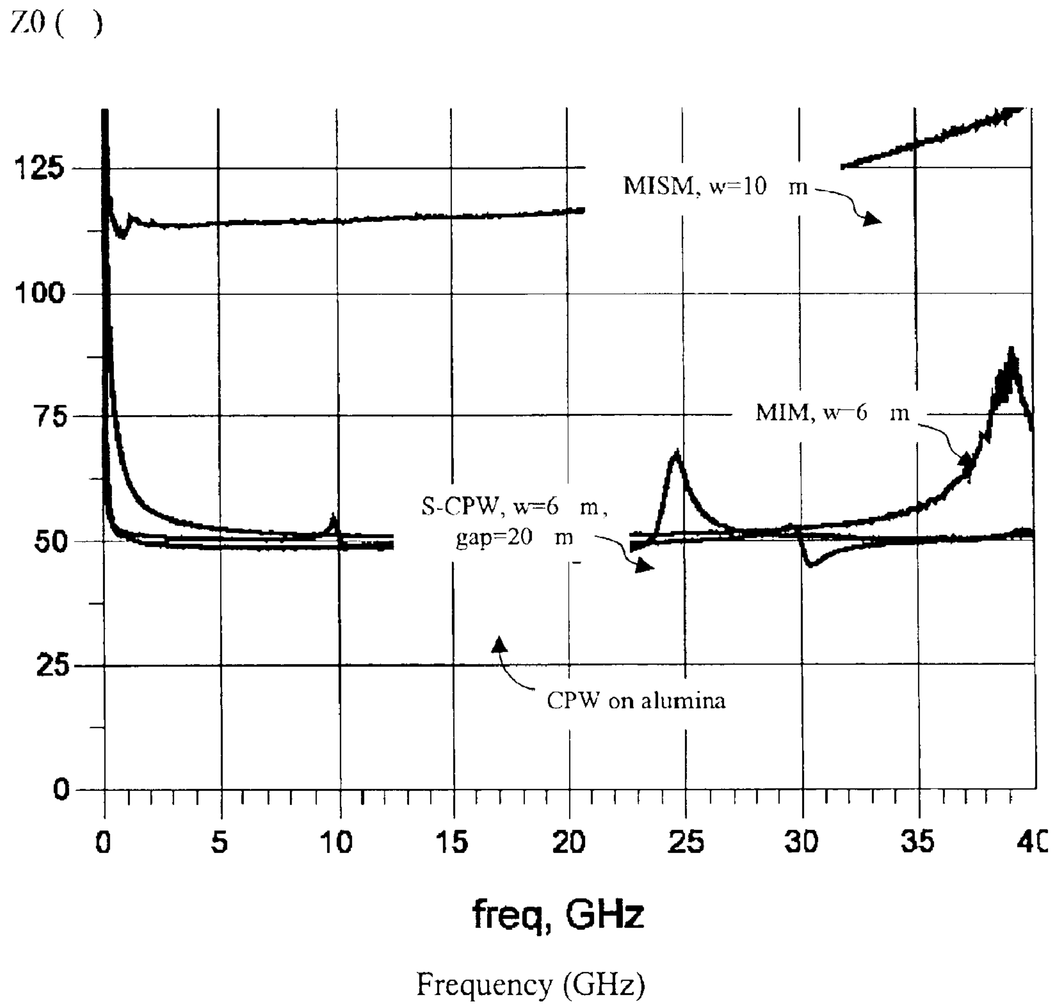
FIG. 5 is a graph showing a comparison of measured characteristic impedance of the slow-wave coplanar transmission line of FIG. 4*a* with transmission lines of the prior art.

Characteristic impedance, defined as the ratio of voltage to current at a given position, is ideally independent of frequency. All transmission line configurations tested, except the MISM line, are designed for a characteristic impedance of 50 Ohms. The measured characteristic impedance Z0 for each of the transmission line configurations, is plotted in FIG. 5. As shown, the measured characteristic impedance is close to the design target with very little variation with frequency for all transmission lines except the MISM. The increase in characteristic impedance with frequency for the MISM line is related to energy coupled into the semiconducting substrate. Within a narrow range of frequencies Z0 does not change significantly, and power transfer can be maximized by using a load which matches the characteristic impedance (i.e., impedance matching). For broader band signals, such as a non-return-to-zero binary data stream in a GBit/s fibre-optic system, any changes in the properties of the interconnect with frequency causes dispersion and distortion of the signal. Signal integrity is improved by shielding the interconnect from the substrate at the cost of lowering the characteristic impedance, and therefore both MIM and S-CPW lines show performance comparable to the reference standard (CPW-on-Alumina).

Figure 6:
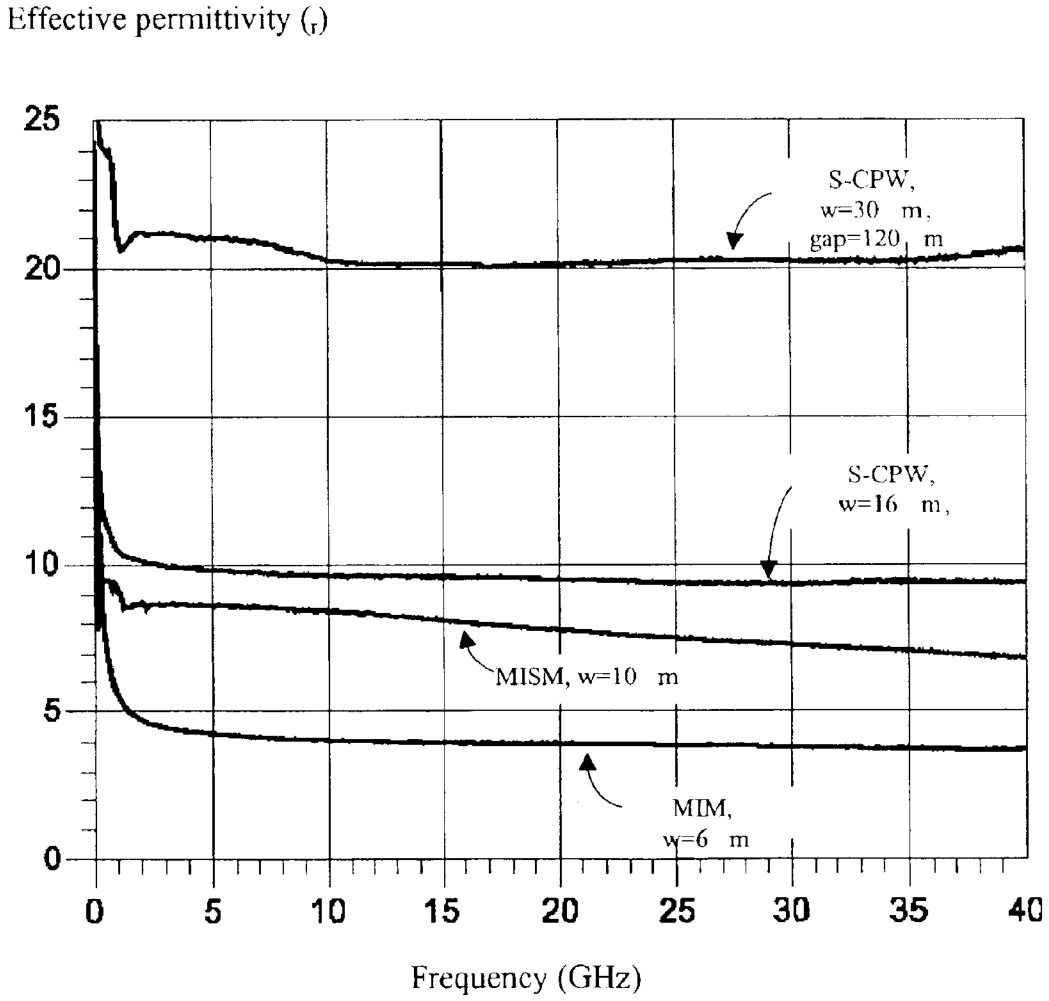
FIG. 6 is a graph showing a comparison of the measured effective permittivity of the slow-wave coplanar transmission line of FIG. 4*a* with transmission lines of the prior art.

Referring now to FIG. 6, the wave velocity and wavelength are inversely proportional to the square root of the effective permittivity (where $\epsilon_r$ is effective permittivity) of a transmission line. The plot of FIG. 6 shows effective permittivity as a function of frequency for the four transmission lines. Since silicon dioxide is used as the insulator, the effective permittivity of the MIM line is approximately 4 over the entire frequency range, as expected, giving a wavelength about one-half that of the same signal travelling through air. The speed of a wave on an MISM line varies with frequency, increasing as more energy is coupled into the substrate. This causes pulse dispersion, which impairs the risetime in digital circuits. The two S-CPW lines show much less variation but also effective permittivity of 9 and as high as 20 in this example, indicative of wavelength reduction. Note that widening the gap between the center conductor 122 and the coplanar grounds 124, 126 results in a shorter wavelength, and therefore the wavelength of an S-CPW transimssion line is adjustable at the circuit design level. A short wavelength for a given frequency saves chip area, as the length of transmission line required to realize a given phase shift shrinks along with the wavelength. Thus, the S-CPW line saves space resulting in compact high performance on-chip components.

As will be understood by one skilled in the art, the quality factor (Q-factor), a quantifiable quality measurement, is defined as:

$$Q = \frac{\text{Energy stored per cycle}}{\text{Energy dissipated per cycle}},$$

when excited by a sine wave. Energy lost due to dissipation clearly results in decreased quality factor.

Figure 7:
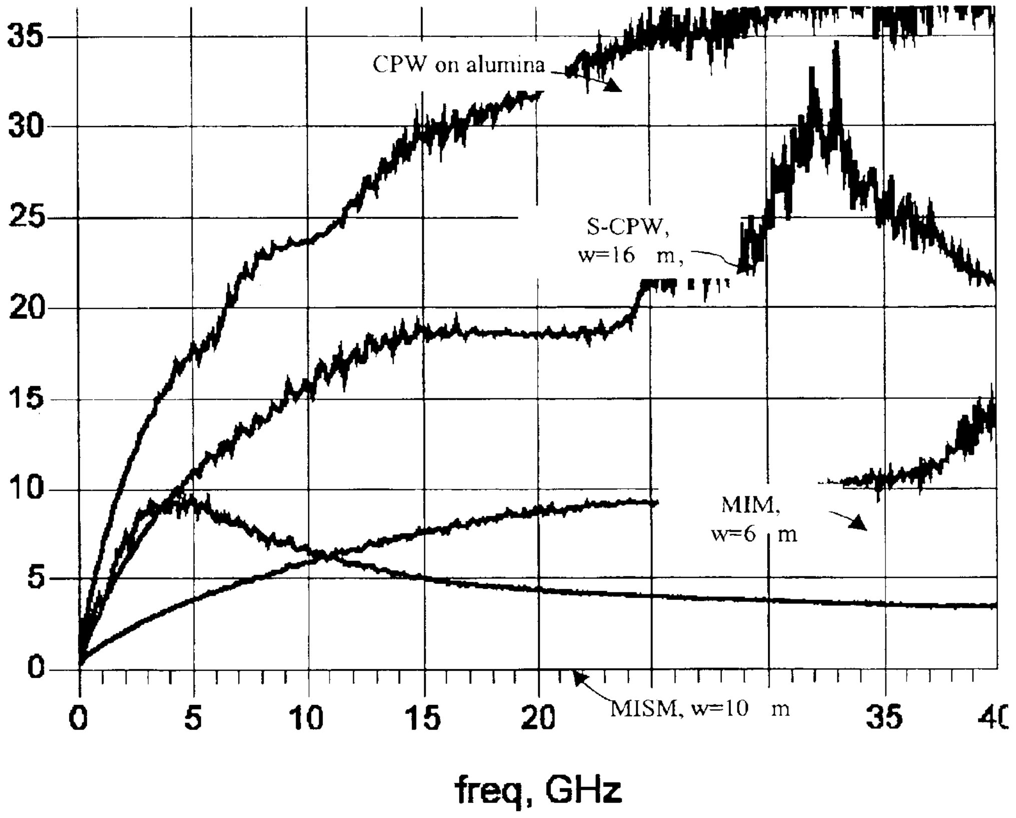
FIG. 7 is a graph showing a comparison of the measured quality factor (Q-factor) of the slow-wave coplanar transmission line of FIG. 4*a* with transmission lines of the prior art.

The quality (Q) factor for the reference CPW, S-CPW, MIM and MISM lines are compared in FIG. 7. Dissipation in the reference line (CPW-on-Alumina) is caused mainly by ohmic losses in the gold conductors and less by losses in the alumina substrate and radiation of the fields. The Q-factor increases almost continually with frequency. Peak Q-factor values of 40–100 are typical for the CPW transmission line fabricated with gold conductors on an insulating substrate (i.e., the reference standard). For the MISM line, the Q-factor initially rises with frequency, but as more energy is coupled in to the silicon layer, the Q-factor begins to fall, reaching a peak of approximately 8 between 3 and 4 GHz frequency. This is very similar to the behavior of a spiral inductor fabricated on a silicon chip. The MIM structure almost entirely blocks energy from the semiconductor layer, but with only a 4 micron separation between signal and ground conductors, relatively little energy is stored in the magnetic field, which limits the Q-factor. The S-CPW transmission line configuration shields the electric field and allows the magnetic field to fill a larger volume, in effect increasing the energy stored by the transmission line. This causes a change in wavelength but also a dramatic increase in Q-factor. The Q-factor is improved by a factor of 2 compared to the MIM structure fabricated in copper over most of the frequency range, and by a factor of 3 in the mm-wave range between 32 and 33 GHz.

Figure 8:
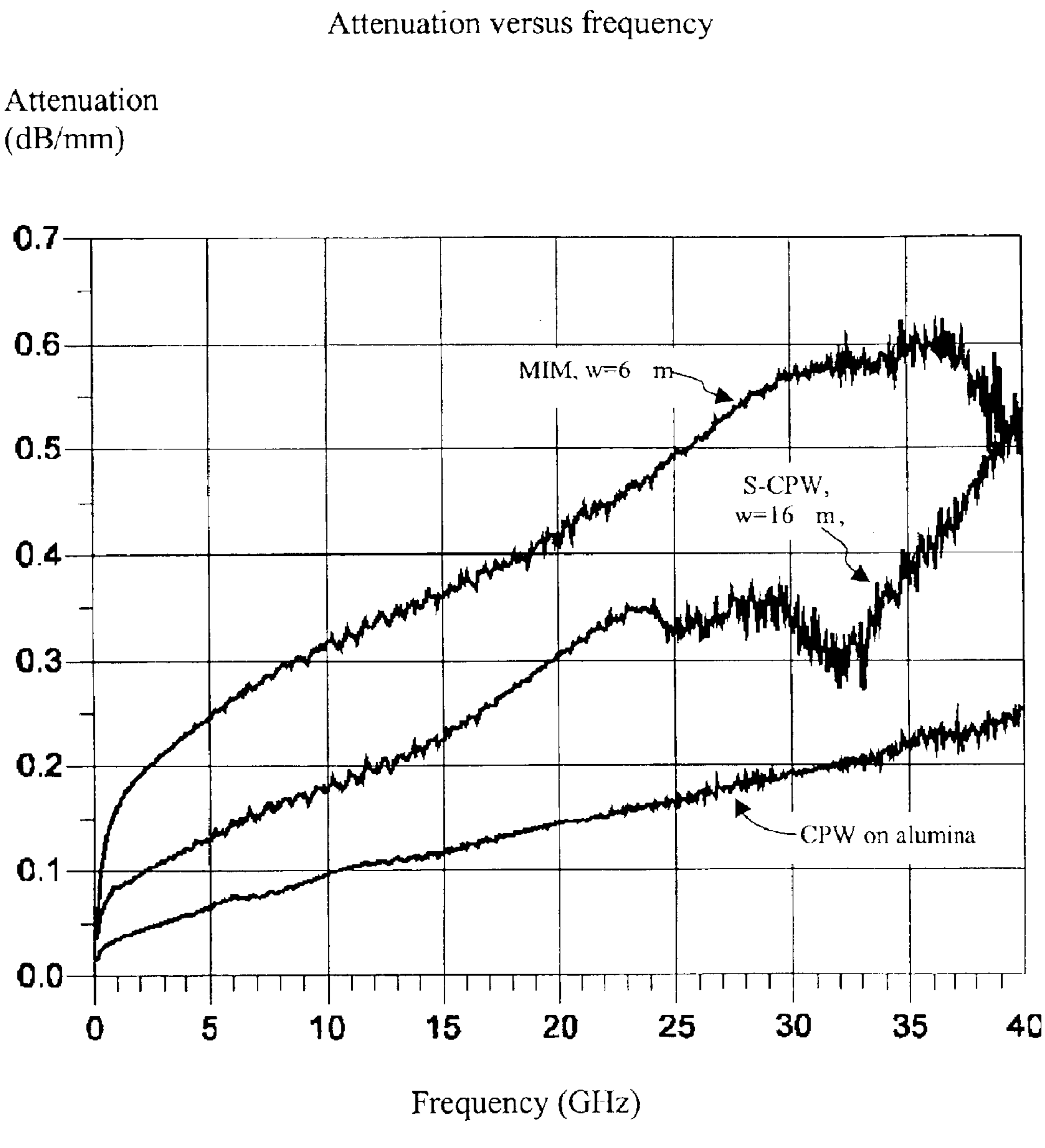
FIG. 8 is a graph showing a comparison of measured attenuation of the slow-wave coplanar transmission line of FIG. 4*a* with the transmission lines of the prior art.

Referring now to FIG. 8, a comparison of the measured attenuation per millimeter length is provided. The attenuation per millimeter of length is consistent with the Q-factor data.

The realization of high-Q components at mm-wave frequencies permits the realization of higher impedances and therefore higher gain from an amplifier with a tuned or narrowband load fabricated using an advanced IC technology. The performance of the novel transmission lines implemented in the silicon IC technology compares very favorably with the off-chip reference line, which is fabricated using high-quality materials on an insulating substrate. The proposed technique of wavelength reduction improves the quality, lowers the loss per unit length, and reduces the wavelength of the transmission lines. This opens the possibility of compact implementation of microwave couplers and combiners on semiconducting silicon substrates for applications such as distributed amplifiers and power amplifiers, which are usually implemented in more expensive technologies that use semi-insulating substrates (e.g., GaAs or InP).

It will be appreciated that the present invention may take many forms and is not limited to the slow-wave coplanar conductor transmission line 120, as described in detail above.

Figure 9:
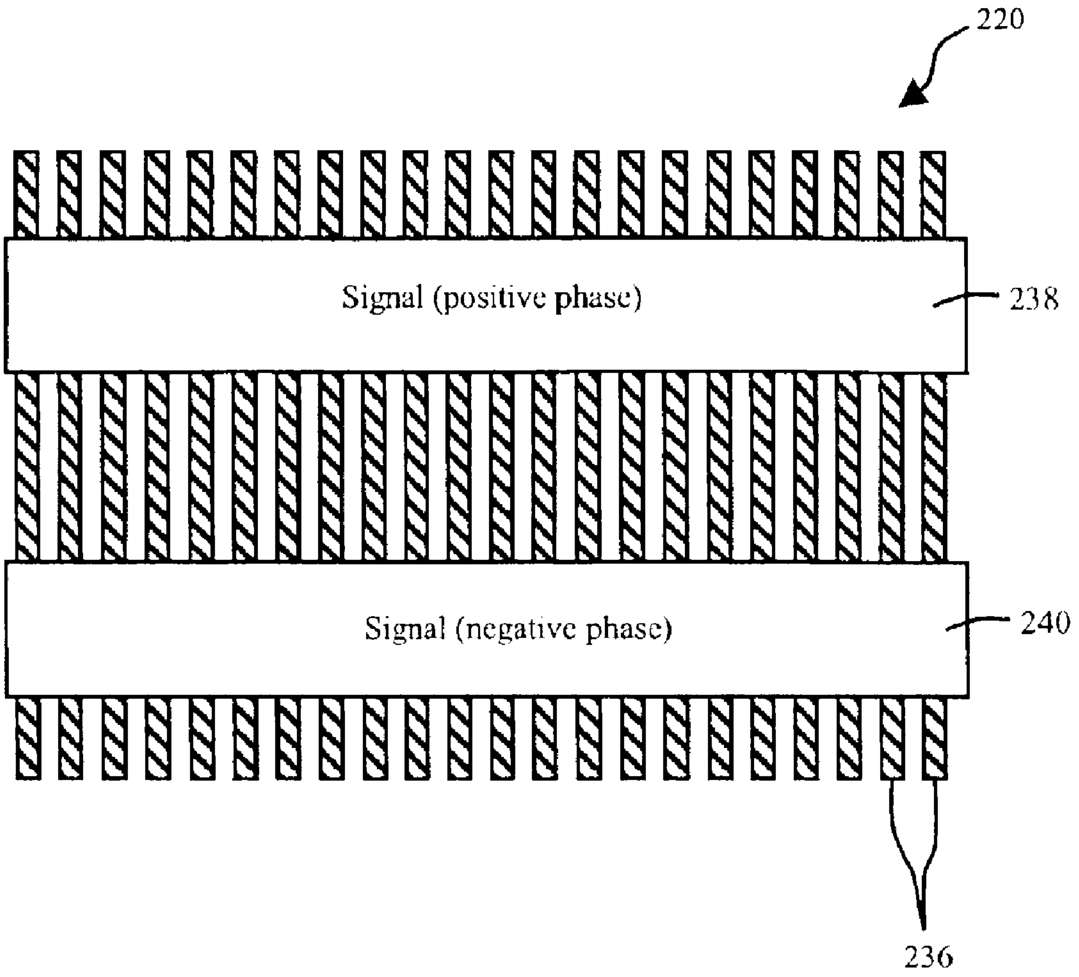
FIG. 9 is a simplified top view of a portion of a balanced transmission line in accordance with an alternate embodiment of the present invention.

Reference is made to FIG. 9 to describe a second embodiment of a transmission line of the present invention. FIG. 9 shows a top view of a portion of a balanced or differential transmission line 220 that includes a pair of coplanar balanced signal conductors 238, 240 and a plurality of metal strips 236 disposed beneath the balanced signal conductors 238, 240. It will be appreciated that the coplanar balanced signal conductors 238, 240 include a positive phase signal conductor 238 and a negative phase signal conductor 240. The metal strips 236 are not connected to either of the signal conductors 238, 240 and inhibit the electric field from radiating to the underlying semiconducting silicon substrate. Again the minimum dimension (or width, as measured in the same direction as current flow in the overlying signal conductors) of the strips 236 is oriented to inhibit current induced via magnetic induction between the top coplanar conductors and the strips. It will now be understood that the signal conductors 238, 240 are shielded from the semiconducting substrate and the wavelength of this transmission line is reduced.

Figure 10:
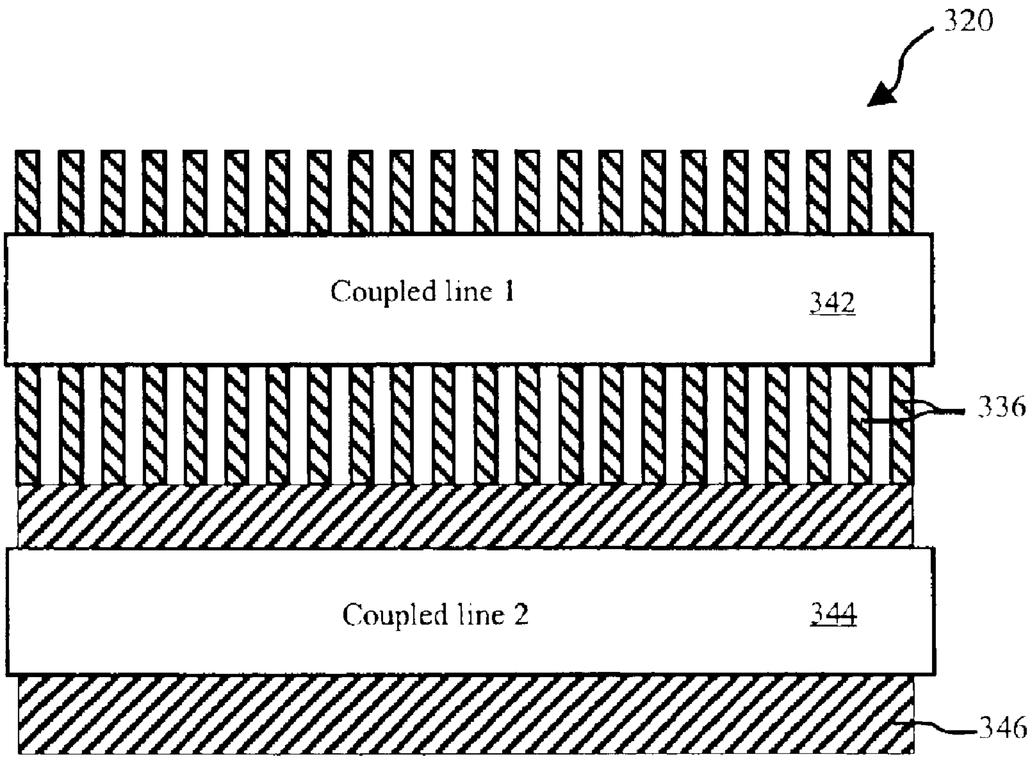
FIG. 10 is a simplified top view of a portion of a coupled transmission line in accordance with another embodiment of the present invention.

Reference is now made to FIG. 10 to describe a third embodiment of a transmission line of the present invention. FIG. 10 shows top view of a portion of a coupled transmission line 320 that includes a first signal line 342 coupled to a second signal line 344. A plurality of metal strips 336 are disposed beneath the first signal line 342 and a floating shield 346 is disposed beneath the second signal line 344. The plurality of metal strips 336 are not connected to either the first or the second signal lines 342, 344, respectively, and inhibit the electric field from the first signal line 342 from radiating to the semiconducting silicon substrate. Similar to the above-described embodiments, the minimum dimension of the strips 336 is oriented to inhibit current induced between the first signal line 342 and the metal strips 336. It will now be understood that the wavelength of the first signal line 342 is smaller than the wavelength of the second signal line 344. Thus, waves travel at different speeds in the different signal lines.

Figure 11:
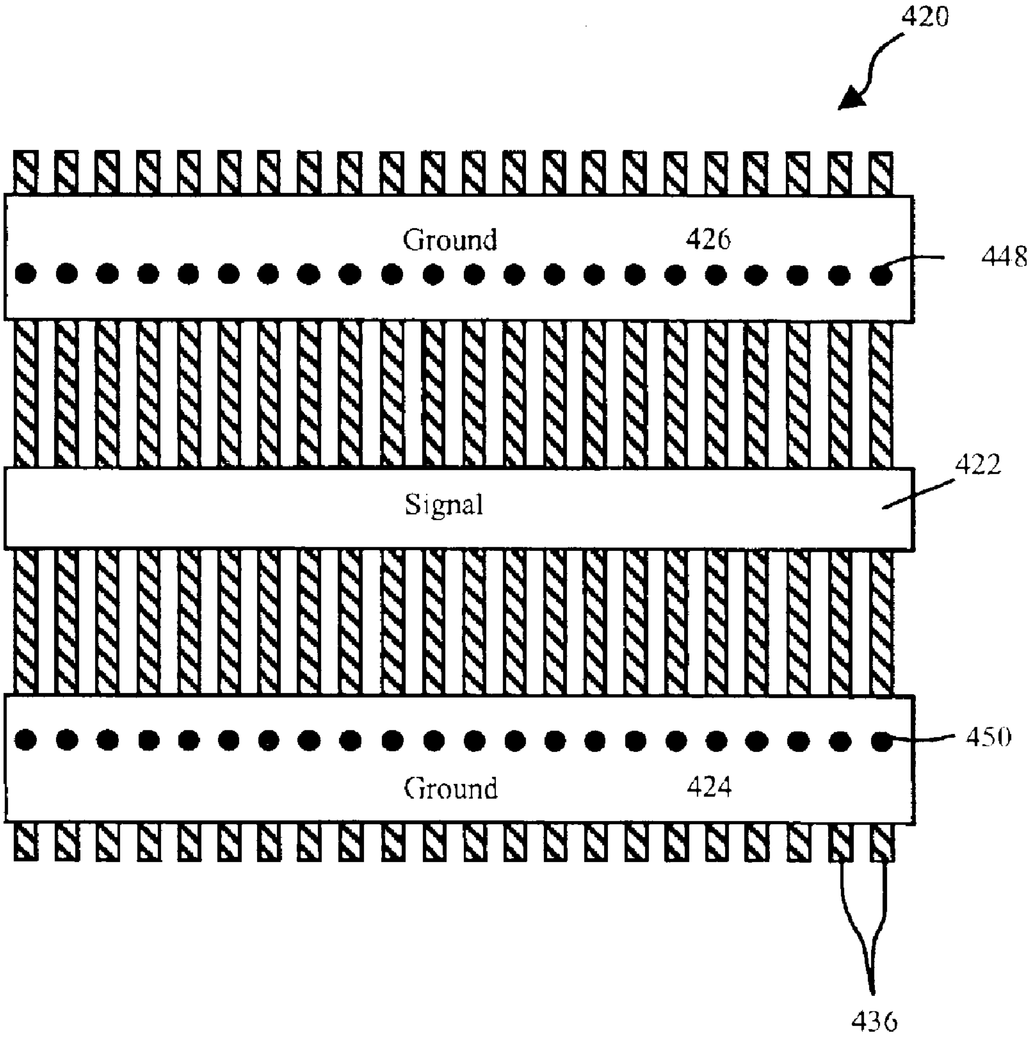
FIG. 11 is a simplified top view of a portion of a single-ended transmission line in accordance with yet another embodiment of the present invention.

Reference is made to FIG. 11 to describe a fourth embodiment of the present invention. FIG. 11 shows a top view of a portion of a single ended transmission line 420 that is similar to the first described embodiment and includes three coplanar conductors, a center signal conductor 422 with two adjacent ground strips 424, 426 to form a coplanar waveguide. A plurality of metal strips 436 are disposed beneath the signal conductor and the ground strips. In the present embodiment, however, the metal strips 436 are connected to the ground conductors 424, 426 through electrical vias 448, 450. Thus, in the present embodiment, the metal strips 436 are not "floating strips", as in the first-described embodiment. This provides a transmission line with reduced wavelength.

Figure 12:
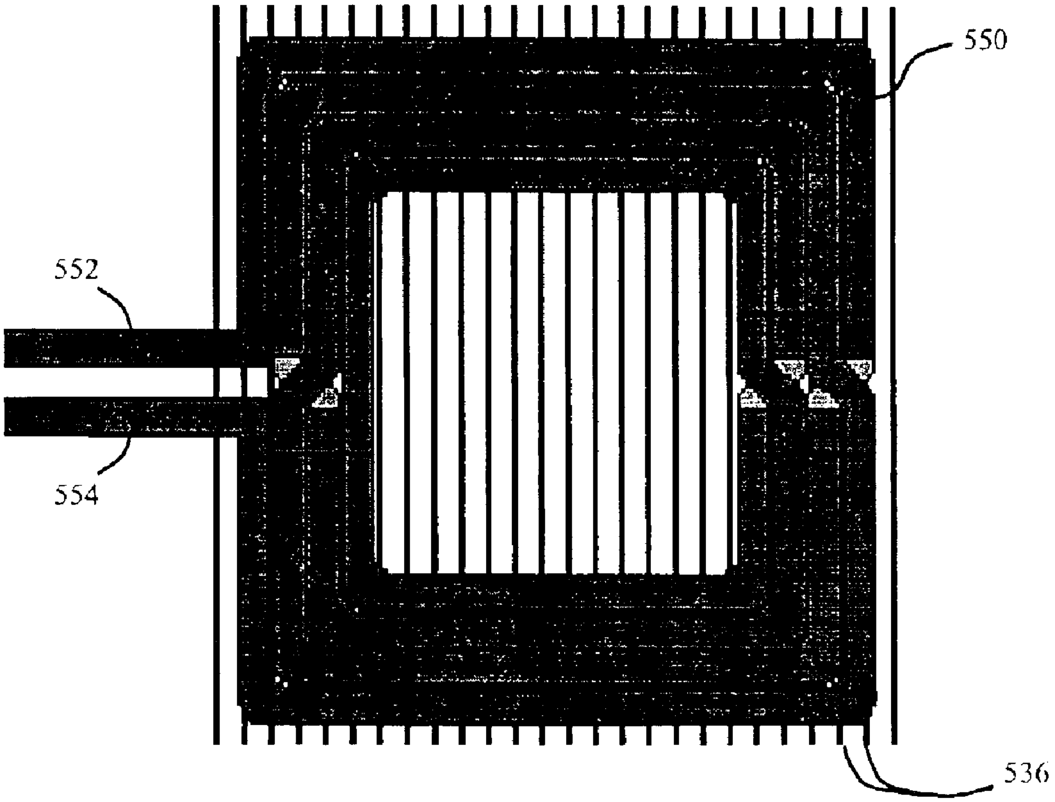
FIG. 12 is a simplified top view of a slow-wave symmetric inductor in accordance with still another embodiment of the present invention.

Referring now to FIG. 12, a fifth embodiment of the present invention is described. FIG. 12 shows a top view of a symmetric inductor 550 including first and second terminals 552, 554 designed using a slow-wave transmission line with a plurality of thin metal strips 536 disposed between the top conductor coil and the semiconducting substrate. It will be appreciated that the thin metal strips 536 shield the top inductor coil 550 from the semiconducting substrate, thereby inhibiting losses to the substrate which contribute to time average energy loss. This reduction in time average energy loss results in an increase in the quality factor (Q-factor) of the inductor.

Figure 13:
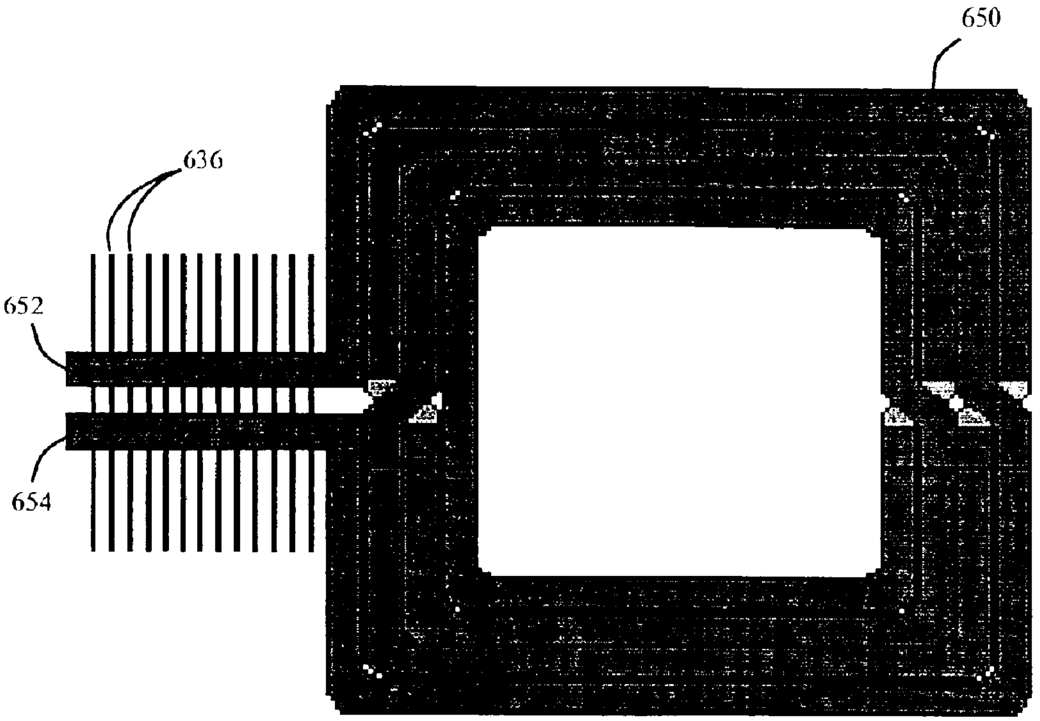
FIG. 13 is a simplified top view of a symmetric inductor with slow-wave interconnects in accordance with another embodiment of the present invention.

Referring to FIG. 13, a sixth embodiment of the present invention is described. FIG. 13 shows a top view of a symmetric inductor 650 with slow-wave interconnects (or terminals). The symmetric inductor 650 includes first and second terminals 652, 654 and a plurality of thin metal strips 636 disposed beneath the first and second terminals 652, 654. It will now be understood that the signal terminals are shielded from the semiconducting substrate, thereby reducing losses.

Figure 14:
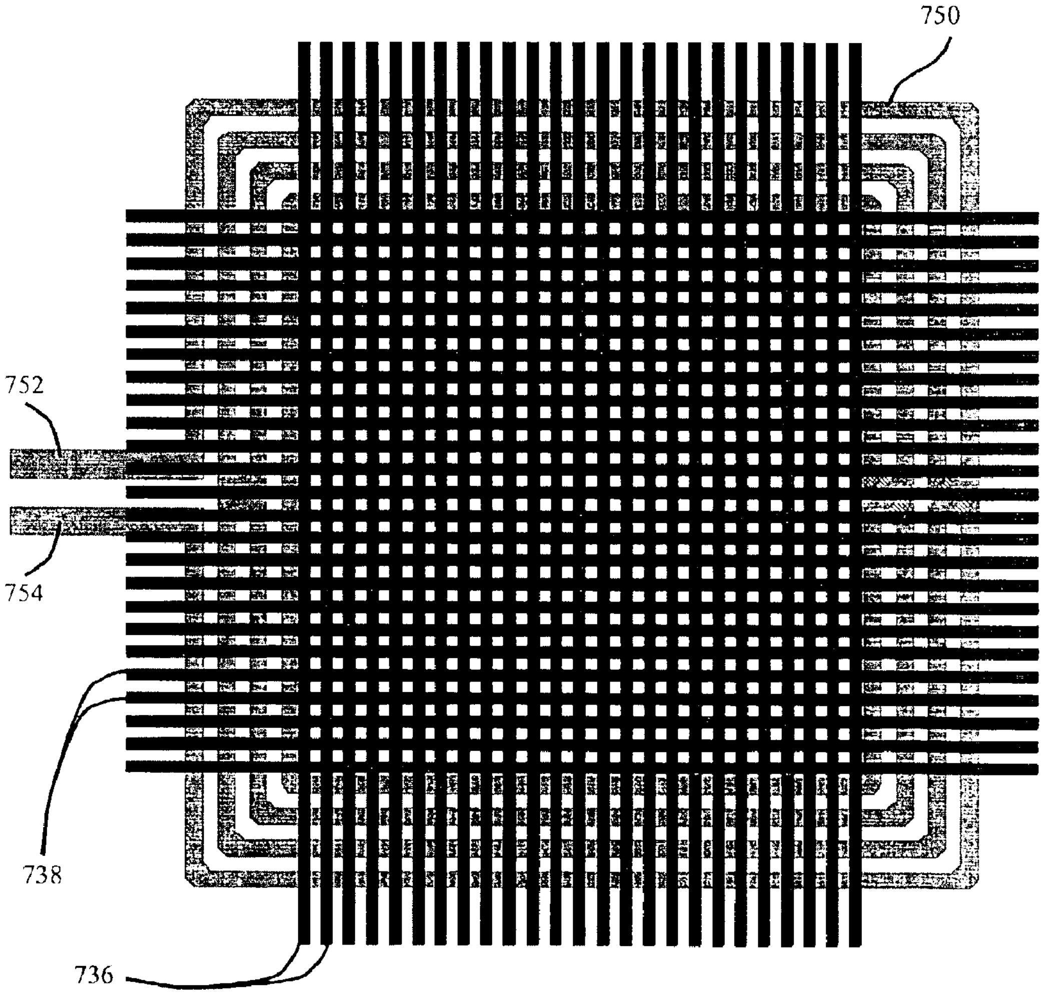
FIG. 14 is a simplified bottom view of a slow-wave symmetric inductor in accordance with still another embodiment of the present invention.

Referring to FIG. 14, a seventh embodiment of the present invention is described. FIG. 14 shows a bottom view of a symmetric inductor including the conductor coil 750 with first and second terminals 752, 754 designed using a slow-wave transmission line with a plurality of thin metal strips 736, 738 in lateral and longitudinal directions, respectively. The metal strips 736, 738, implemented with different metal layers, are disposed between the conductor coil 750 and the semiconducting substrate. A voltage induced on a portion of the coil 750, along one side thereof is compensated for by an equal but opposite voltage induced at another portion of the coil 750, at the opposite side thereof, when the inductor is driven differentially. Again, the net electric potential induced on the metal strips 736, 738 is about zero. Induced current is inhibited by placing the metal strips 736, 738 orthogonal to the windings of the coil 750. It will be appreciated that the thin metal strips 736, 738 shield the coil 750 from the semiconducting substrate, thereby inhibiting losses to the substrate which contribute to time average energy loss. This reduction in time average energy loss results in an increase in the quality factor (Q-factor) of the inductor.

Figure 15:
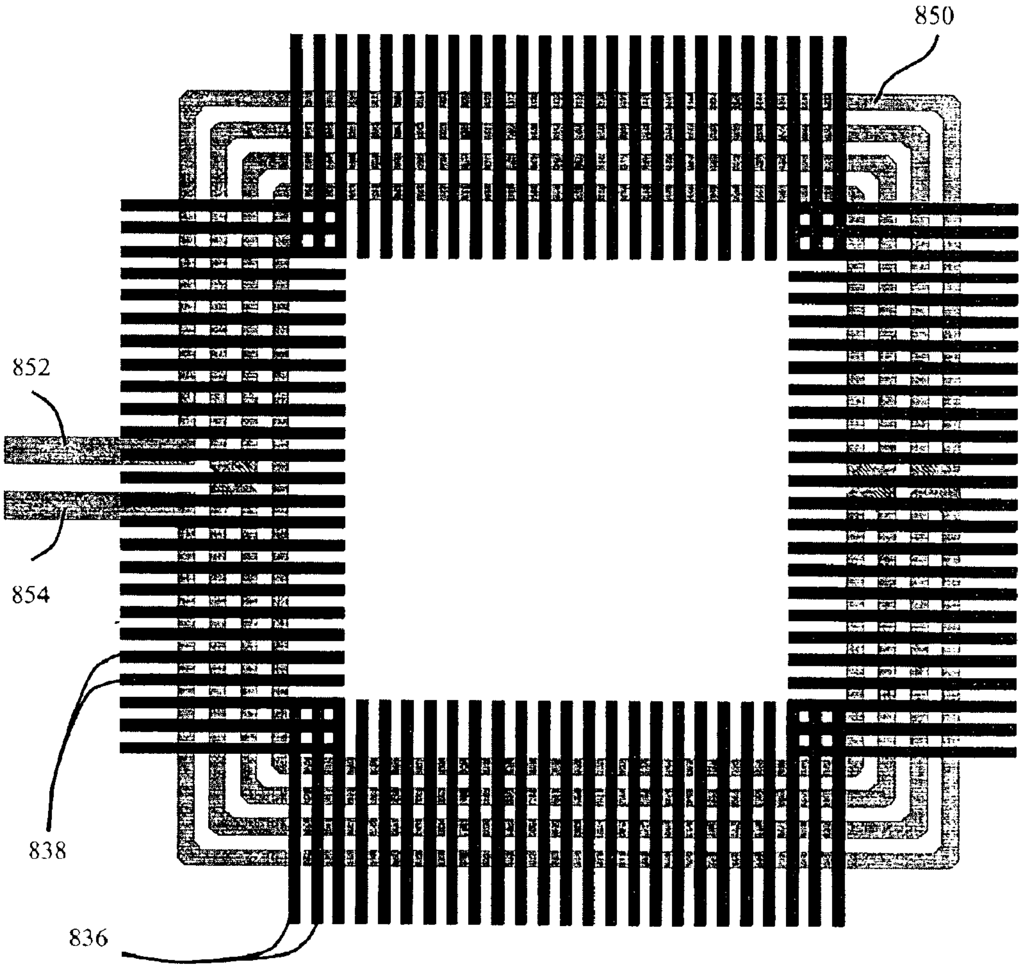
FIG. 15 is a simplified bottom view of a slow-wave symmetric inductor in accordance with yet another embodiment of the present invention.

Referring to FIG. 15, a eighth embodiment of the present invention is described. FIG. 15 shows a bottom view of a symmetric inductor including a conductor coil 850 with first and second terminals 852, 854 designed using a slow-wave transmission line with a plurality of thin metal strips 836, 838 in the lateral and longitudinal directions, respectively. The metal strips 836, 838 implemented with different metal layers are disposed between the conductor coil 850 and the semiconducting substrate. In the present embodiment, shorter lateral and longitudinal metal strips 836, 838, respectively, shield the electric field from the substrate. The metal strips 836, 838 are disposed directly beneath each group of windings of the conductor coil 850, on each side thereof. As there is a phase shift along the coil length, the net potential induced onto each of the metal strips 836, 838 is not zero, but diminishes as the number of metal turns for the conductor coil 850 increases. It will be appreciated that the metal strips 836, 838 shield the coil 850 from the semiconducting substrate, thereby inhibiting losses to the substrate which contribute to time average energy loss. This reduction in time average energy loss results in an increase in the quality factor (Q-factor) of the inductor.

Figure 16:
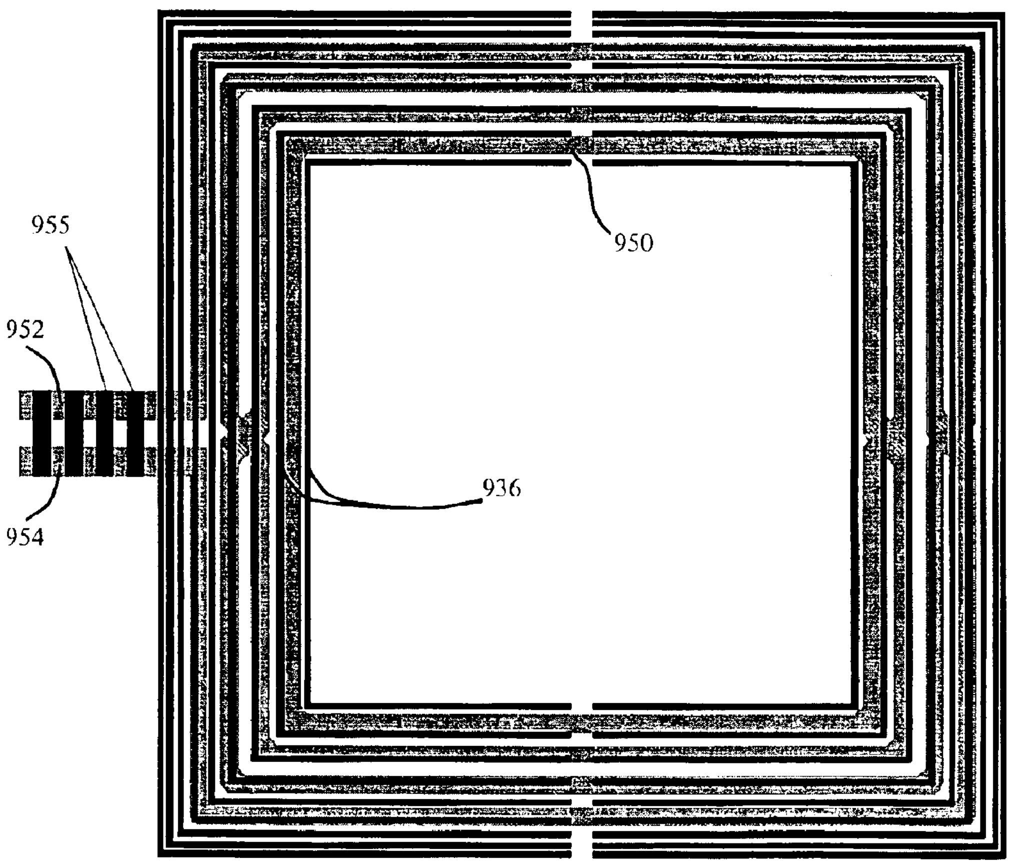
FIG. 16 is a simplified bottom view of a slow-wave symmetric inductor and interconnects in accordance with still another embodiment of the present invention.

Referring now to FIG. 16, a ninth embodiment of the present invention is described. In FIG. 16, there is shown, a bottom view of a plurality of floating metal strips 936 that form a shield pattern for a square symmetric inductor including a conductor coil 950, and the balanced input connections 952, 954 and slow-wave strips 955 for the input connections 952, 954. Each of the floating metal strips 936 runs parallel to the conductor coil 950, and perpendicular to the balanced input connections 952, 954. As shown, each of the floating metal strips 936 includes a central portion with end portions perpendicular to the central portion. It will be recognized that the line of symmetry running horizontally from left to right in FIG. 16, along the center of the coil 950, defines the point where the voltage induced on each of the metal strips 936 for a balanced input is zero. It should also be noted that there are no closed loops to support induced current flow in the metal strips 936. Thus, the addition of the metal strips 936 does not affect the inductance of the inductor. The metal strips 936 are not uniformly spaced, rather they are spaced closer together proximal the outside edge of the coil 950 than the spacing of the metal strips 936 proximal the inside edge of the coil 950. The metal strips 936 block capacitively-coupled currents from entering the silicon substrate, thereby providing an inductor with reduced substrate dissipation and a higher Q-factor.

From the fifth to ninth embodiments described herein, it will be apparent that both the transmission line interconnects and components constructed from transmission lines such as inductor, coupled inductor, or multi-filament coils (i.e., transformer or coupler) can be shielded.

Figure 17A:
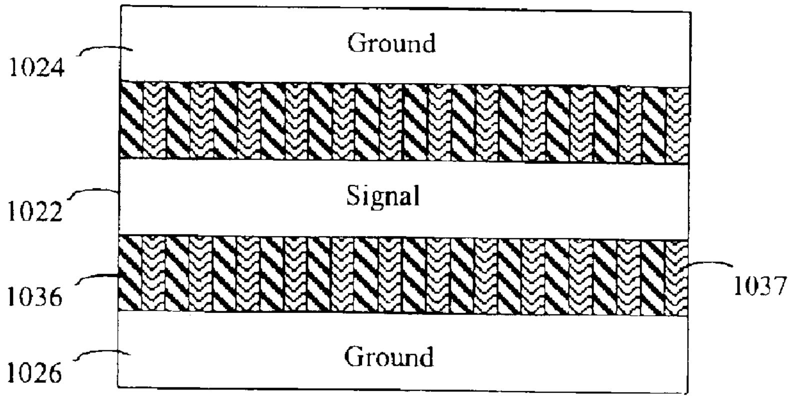
FIG. 17*a* is a simplified top view of a portion of a slow-wave coplanar transmission line according to another embodiment of the present invention.
Figure 17B:
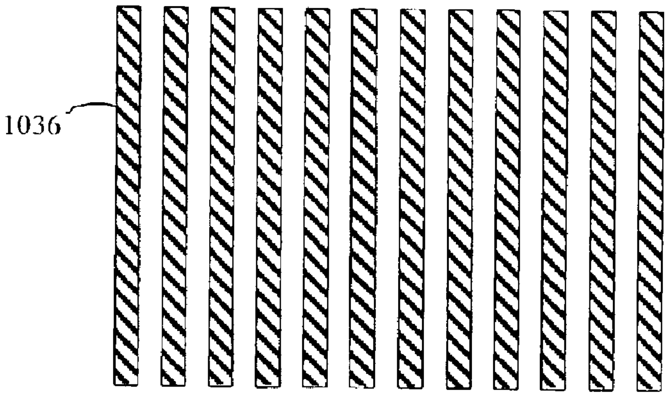
FIG. 17*b* is a simplified top view of a first shield portion of the slow-wave coplanar transmission line of FIG. 17*a;*
Figure 17C:
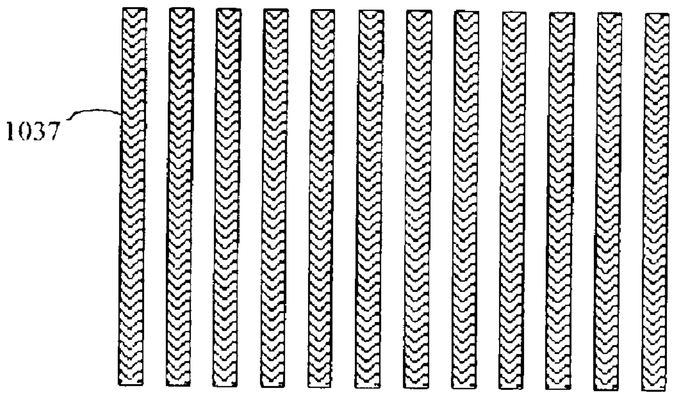
FIG. 17*c* is a simplified top view of a second shield portion of the slow-wave coplanar transmission line of FIG. 17*a;*

Referring now to FIGS. 17*a* to 17*c*, a tenth embodiment of the present invention is described. FIG. 17*a* shows a simplified top view of a portion of a slow-wave coplanar transmission line including three coplanar conductors, a center signal conductor 1022 with two adjacent ground strips 1024, 1026 to form a coplanar waveguide. A first plurality of spaced apart, substantially parallel metal strips 1036 are disposed beneath the signal conductor 1022 and the ground strips 1024, 1026. Also referred to as floating strips, the metal strips 1036 are not connected to either the ground strips 1024, 1026 or the center conductor 1022. A second plurality of spaced apart, substantially parallel metal strips 1037 are disposed beneath the first plurality of metal strips 1036. Clearly, the second plurality of metal strips 1037 are laterally offset from the first plurality of metal strips 1036, as shown in FIG. 17*a*. The first plurality of metal strips 1036 are very tightly spaced such that electric field is inhibited from passing through to the underlying layer. Similarly, the second plurality of metal strips 1037 are very tightly spaced to further inhibit electric field from passing through to the underlying layer.

Figure 18A:
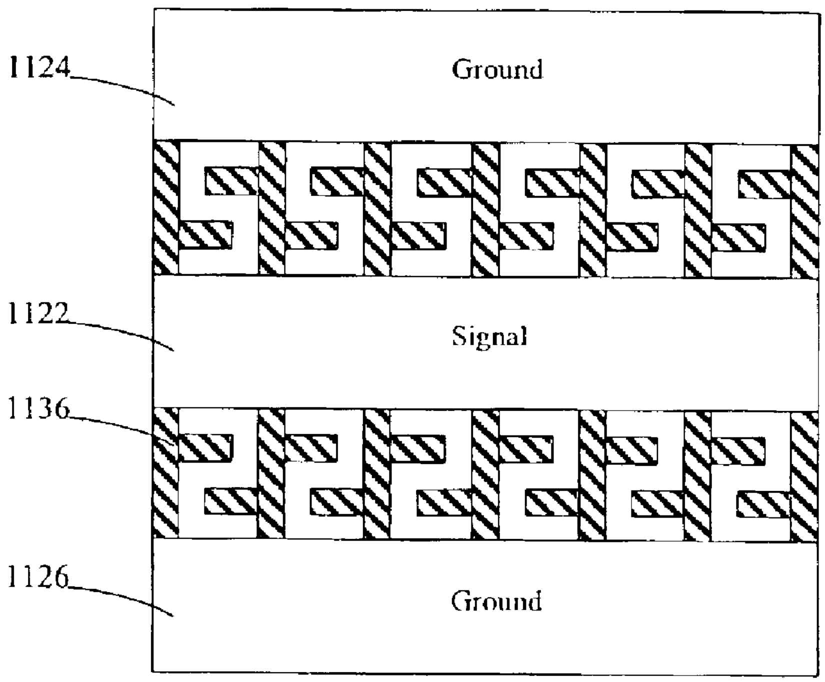
FIG. 18*a* is a simplified top view of a portion of a slow-wave coplanar transmission line according to yet another embodiment of the present invention.
Figure 18B:
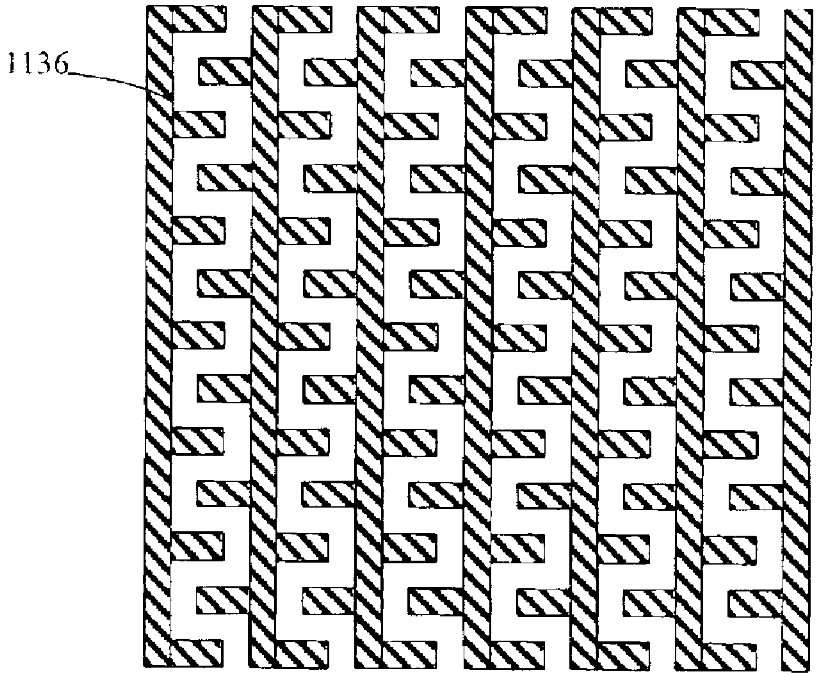
FIG. 18*b* is a simplified top view of a shield portion of the slow-wave coplanar transmission line of FIG. 18*a*.

Referring now to FIGS. 18*a* and 18*b*, an eleventh embodiment of the present invention is described. FIG. 18*a* shows a simplified top view of a portion of a slow-wave coplanar transmission line (S-CPW) including three coplanar conductors, a center signal conductor 1122 with two adjacent ground strips 1124, 1126 to form a coplanar waveguide. A plurality of metal strips 1136 having a plurality of flanges projecting therefrom, are disposed beneath the signal conductor 1122 and the ground strips 1124, 1126. In the present embodiment, the flanges of the metal strips 1136 correspond to and fit between flanges of an adjacent one of the metal strips 1136. Also referred to as floating strips, the metal strips 1136 are not connected to either the ground strips 1124, 1126 or the center conductor 1122. The plurality of metal strips 1136 are very tightly spaced such that electric field is inhibited from passing through to the underlying layer.

While the embodiments described herein are directed to particular implementations of the present invention, it will be understood that modifications and variations to these embodiments are within the scope and sphere of the present invention. For example, the size and shape of many of the elements described can vary while still performing the same function. The present invention is not limited to components fabricated on a silicon substrate, and other substrates can be used, such as gallium arsenide, germanium, or the like. The shield strips can be made of the same metal as the conductors, or coils, or can be made of different metals and have different thicknesses. Also, the present invention is not limited to the particular component (e.g., inductor and transformer) shapes described herein. Other configurations such as three-dimensional configurations including three-dimensional coil windings, are possible as the present invention is not limited to planar structures. Further, the present invention is not limited to the particular components described and other components, including other inductors, transformers or any other component consisting of filamentary conductors, are possible. Multiple layers of metal, or coil layers, and one or more inter-woven filaments on each coil layer are possible, a coil layer being composed of one or more filaments in general. For example, a bifilar transformer with two filaments having independent connections is possible. Those skilled in the art may conceive of still other variations, all of which are believed to be within the sphere and scope of the present invention.

What is claimed is:

1. A slow-wave transmission line component comprising:
- at least two conductors;
- a semiconducting substrate material disposed beneath said at least two conductors; and
- an insulator disposed between said at least two conductors and said semiconducting substrate material;
- a plurality of metal strips disposed between at least one conductor of said at least two conductors and said substrate material such that said insulator is disposed between said plurality of metal strips and said at least one conductor and between said plurality of metal strips and said substrate material, the metal strips being closely spaced apart such that an electric field from said conductors is inhibited from passing the metal strips to the semiconducting substrate material.

2. The slow-wave transmission line component according to claim 1, wherein said metal strips are spaced apart an average distance of less than a width of the conductors.

3. The slow-wave transmission line component according to claim 1, wherein said metal strips are spaced apart an average distance of less than ten times a width of the strips.

4. The slow-wave transmission line component according to claim 1, wherein said metal strips are spaced apart an average distance of less than a width of the strips.

5. The slow-wave transmission line component according to claim 1, wherein said metal strips are spaced apart an average distance of less than one tenth of a width of the metal strips.

6. The slow-wave transmission line component according to claim 1, wherein said metal strips are spaced apart a distance of less than 1.6 microns.

7. The slow-wave transmission line component according to claim 1, wherein said metal strips are oriented to inhibit current induced via magnetic induction between said at least two conductors and said metal strips.

8. The slow-wave transmission line component according to claim 1, wherein said plurality of metal strips are substantially parallel.

9. The slow-wave transmission line component according to claim 8, wherein said at least two conductors comprise signal conductors and said plurality of metal strips are arranged such that the minimum dimension of the strips is substantially parallel to the direction of current flow along said signal conductors.

10. The slow-wave transmission line component according to claim 8, wherein said at least two conductors comprise a central signal conductor and two adjacent return signal conductors, said plurality of metal strips being disposed between the three conductors and the substrate material.

11. The slow-wave transmission line component according to claim 10, wherein said three conductors are substantially coplanar.

12. The slow-wave transmission line component according to claim 10, wherein said return conductors are connected to said plurality of metal strips by interconnecting vias.

13. The slow-wave transmission line component according to claim 8, wherein said at least two conductors comprise a pair of balanced signal conductors including a positive phase signal conductor and a negative phase signal conductor, said plurality of metal strips being disposed between said pair of balanced signal conductors and said substrate material.

14. The slow-wave transmission line component according to claim 13, wherein said pair of balanced signal conductors are substantially parallel.

15. The slow-wave transmission line component according to claim 8 wherein said at least one conductor of said at least two conductors comprises a first signal conductor, said plurality of metal strips disposed between said first signal conductor and said substrate material, a second conductor of said at least two conductors comprising a second signal conductor coupled to said first signal conductor.

16. The slow-wave transmission line component according to claim 15, further comprising a floating shield disposed between said second signal conductor and said substrate material.

17. The slow-wave transmission line component according to claim 1, wherein said at least two conductors comprise an inductor having first and second terminals.

18. The slow-wave transmission line component according to claim 1, further comprising a second plurality of metal strips, said strips disposed between said first plurality of metal strips and said substrate material, the second plurality of metal strips being closely spaced apart such that an electric field from said conductors is inhibited from passing the metal strips to the substrate material.

19. The slow-wave transmission line component according to claim 1, wherein the metal strips include a plurality of flanges projecting from each of said strips.

20. The slow-wave transmission line component according to claim 1, wherein a pitch of said strips is greater than or equal to a spacing between the strips.

21. A filamentary component comprising:

at least one metal filament;

a semiconducting substrate disposed beneath said filament; and an insulator disposed between said at least one metal filament and said semiconducting substrate material;

a plurality of metal strips disposed between said at least one filament and said substrate material such that said insulator is disposed between said plurality of metal strips and said at least one metal filament and between said plurality of metal strips and said semiconducting substrate, said metal strips being closely spaced apart such that an electric field from said at least one filament is inhibited from passing the metal strips to the semiconducting substrate.

22. The component according to claim 21, wherein said plurality of metal strips includes a first plurality of metal strips disposed in a lateral direction and a second plurality of metal strips disposed in a longitudinal direction.

23. The component according to claim 21, wherein at least some of said plurality of metal strips include portions that are substantially of the same shape as said filament.

24. The component according to claim 21, wherein at least some of said plurality of metal strips include portions substantially parallel with portions of said filament.

25. The component according to claim 24, wherein at least some of said plurality of metal strips include ends that are perpendicular to said portions.

26. The component according to claim 24, wherein a spacing between said plurality of metal strips is inconsistent.

27. The component according to claim 24, wherein a spacing between said plurality of metal strips decreases from a spacing between an innermost pair of said plurality of metal strips to a spacing between an outermost pair of said plurality of metal strips.

28. The component according to claim 21, further comprising circuit interconnections and a plurality of shielding strips disposed between said interconnections and said substrate material.

29. The component according to claim 28, wherein said plurality of shielding strips are arranged in a direction orthogonal to a direction of said circuit interconnections.

* * * * *